United States Patent [19]

Satoh et al.

[11] Patent Number: 4,836,881
[45] Date of Patent: Jun. 6, 1989

[54] PROCESS FOR SYNTHESIZING LARGE DIAMOND

[75] Inventors: Shuichi Satoh; Kazuwo Tsuji, both of Hyogo, Japan

[73] Assignee: Sumitomo Electric Industries, Ltd., Osaka, Japan

[21] Appl. No.: 192,046

[22] Filed: May 9, 1988

[30] Foreign Application Priority Data

May 8, 1987 [JP] Japan .................. 62-112862

[51] Int. Cl.⁴ .............. C01B 31/06; C30B 11/13
[52] U.S. Cl. .................. 156/621; 156/616.3; 156/DIG. 68; 423/446; 501/86
[58] Field of Search ......... 156/616.3, 621, DIG. 68; 423/446; 501/86

[56] References Cited

U.S. PATENT DOCUMENTS

| | | | |
|---|---|---|---|
| 4,034,066 | 7/1977 | Strong | 423/446 |
| 4,073,380 | 2/1978 | Strong et al. | 423/446 |
| 4,082,185 | 4/1978 | Strong | 423/446 |
| 4,547,257 | 10/1985 | Iizuka et al. | 423/446 |
| 4,617,181 | 10/1986 | Yazu et al. | 423/446 |
| 4,632,817 | 12/1986 | Yazu et al. | 423/446 |

FOREIGN PATENT DOCUMENTS

| | | | |
|---|---|---|---|
| 0157393 | 10/1985 | European Pat. Off. | 423/446 |
| 48-32518 | 10/1973 | Japan | 423/446 |
| 56-69211 | 6/1981 | Japan | 423/446 |

OTHER PUBLICATIONS

Patent Abstracts of Japan, vol. 7, No. 171 (C-178)[1316], 7/28/83 & JP-A-58 79 89 (Sumitomo Denki Kogyo K.K) 13-05-1983.
Die Naturwissenschaften, vol. 59, No. 1, Jan. 1972, pp. 1-7, Springer Verlag, Berlin, DE; H. M. Strong et al.
Soviet Physics Doklady, vol. 29, No. 7, Jul. 1984, pp. 523-525, American Institute of Physics, New York, US; A. V. Nikitin.

*Primary Examiner*—John Doll
*Assistant Examiner*—Robert M. Kunemund
*Attorney, Agent, or Firm*—Sughrue, Mion, Zinn, Macpeak & Seas

[57] ABSTRACT

A process for synthesizing a large diamond having a diameter of 8 mm or more by the temperature gradient method, wherein a (111) or (100) surface of a seed crystal having a diameter of 3 mm or more is used as a growing surface, the entire area of the growing surface is first dissolved in the diamond-stable region before crystal growth is started, the crystal growth is effected using a plug of a solvent in which the height of the central portion thereof is higher than the height of the peripheral portion thereof, the plug of a solvent has a planar or curved surface on the side where the plug of a solvent contacts a carbon source during the crystal growth, and the crystal growth is effected under such pressure and temperature conditions that the growth of the (111) or (100) surface is predominant.

6 Claims, 9 Drawing Sheets

PROCESS FOR SYNTHESIZING LARGE DIAMOND

BACKGROUND OF THE INVENTION

The present invention relates to a process for synthesizing a large single crystal diamond by the temperature gradient method.

Synthesis of diamond by the temperature gradient method has been known in the art which was first established by the General Electric Company as described in U.S. Pat. No. 4,034,066 which is incorporated herein by reference. As a result of subsequent efforts toward large-scale production (Japanese Patent Application (OPI) Nos. 152214/84 and 210512/85), diamonds synthesized by this method are commercially available as heat sinks, superprecision cutting tools, and other fabricated products. (The term "OPI" used herein means a published unexamined Japanese patent application.)

The temperature gradient method is shown schematically in FIG. 1. A vessel (not shown) capable of producing superhigh pressures is equiped with a carbon source (1), a solvent (2), a seed crystal (3) and a seed crystal dissolution preventing layer (4), and the vessel is heated with a heater (5) to produce a differential temperature $\Delta T$ between the carbon source and the seed crystal, which is used as a driving force for the epitaxial growth of a single crystal diamond on the seed crystal.

The conventional methods of diamond synthesis can produce single crystal diamonds of up to 2 carat (6 mm in diameter) but such methods cannot applicable to the production of diamonds having a diameter of 8 mm or more which are used in $CO_2$ laser windows, infrared light emission windows, medical scalpels, IC bonders, etc. In addition, a growth period of at least two weeks is required to synthesize a diamond of 2 carat, and this is costly and is not suitable for practical applications.

These defects of the conventional diamond synthesis methods can mainly be ascribed to the following two reasons:

(i) If a large single crystal diamond is intended to synthesize from a large seed crystal ($\geq 3$ mm), only a cluster of crystals is obtained instead of a single crystal with good quality;

(ii) If the crystal grows to 2 carat or larger, inclusions (entrapment) of the solvent into the crystal is accelerated and a desired single crystal with good quality cannot be attained.

If these problems are intended to avoid by the conventional methods, gradual growth from a small seed crystal must be conducted but the growth period is much extended so that the synthesis of diamond becomes a very costly process. Furthermore, the accelerated inclusions of the solvent (i.e., a metallic solvent) occur when the crystal size exceeds 2 carat, and prevents the synthesis of a commercially acceptable single crystal diamond.

SUMMARY OF THE INVENTION

An object, therefore, of the present invention is to provide a process for synthesizing a large single crystal diamond without suffering from the two major disadvantages of the prior art temperature gradient method described above.

Other objects and effects of the present invention will be apparent from the following description.

The above objects of the present invention can be attained by a process for synthesizing a large diamond having a diameter of 8 mm or more by the temperature gradient method, wherein a (111) surface of a seed crystal having a diameter of 3 mm or more is used as a growing surface, the entire area of the growing surface is first dissolved in the diamond-stable region before crystal growth is started, the crystal growth is effected using a plug of a solvent in which the height of the central portion thereof is higher than the height of the peripheral portion thereof, the plug of a solvent has a planar or curved surface on the side where the plug of a solvent contacts a carbon source during the crystal growth, and the crystal growth is effected under such pressure and temperature conditions that the growth of the (111) surface is predominant.

The objects of the present invention can also be attained by a process for synthesizing a large diamond having a diameter of 8 mm or more by the temperature gradient method, wherein a (100) surface of a seed crystal having a diameter of 3 mm or more is used as a growing surface, the growing surface is exposed to a diamond-stable pressure and to a temperature from 20° to 60° C. higher than the eutectic point of a solvent and carbon, the entire area of the growing surface is first dissolved before crystal growth is started, the crystal growth is effected using a plug of a solvent in which the height of the central portion thereof is higher than the height of the peripheral portion thereof, the plug of a solvent has a planar or curved surface on the side where the plug of a solvent contacts a carbon source during the crystal growth, and the crystal growth is effected under such pressure and temperature conditions that the growth of the (100) surface is predominant.

BRIEF DISCRIPTION OF THE DRAWINGS

DETAILED DESCRIPTION OF THE INVENTION

Figure 1:
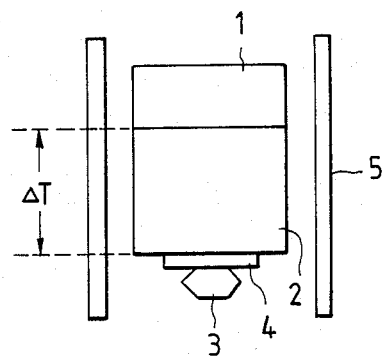
FIG. 1 is a schematic presentation of a priot art process of diamond synthesis by the temperature gradient method.

With a view to solving the aforementioned problems of the prior art process of diamond synthesis, the present inventors adopted the following approaches as one embodiment of the present invention.

(i) In order to have a single crystal of good quality grown from a large seed crystal, the surface of the seed crystal is first dissolved before a crystal is allowed to grow from the seed;

(ii) In order to synthesize diamond of 2 carat or larger without solvent entrapment, (a) a (111) surface of a seed crystal is used as a growing surface and is allowed so that the growing surface having the fastest growing rate is perpendicular to the direction of carbon diffusion; and (b) uniform carbon diffusion concentration at the growing surface is ensured by shaping a plug of a solvent in such a way that the height of its central portion is higher than the height of its peripheral portion, preferably the central portion is higher than the peripheral portion by 20 to 200%, or the area in contact with the carbon source is spherical; or (c) a (100) surface of a seed crystal is used as a growing surface and is allowed so that the growing surface having the fastest growing rate is perpendicular to the direction of carbon diffusion by ensuring that crystal growth occurs at a temperature from 20° to 60° C. higher than the eutectic point of the solvent and carbon so that the growing rate of the (100) surface is made maximum.

Previous attempt at synthesizing single-crystal diamond with a diameter of 8 mm or more have had the following problems:

(A) Growth periods are very long ($\geq 2$ weeks); and (B) When the growth size exceeds 6 to 7 mm (2 carat), accelerated inclusions of the metallic solvent occur to prevent the formation of a single crystal of high quality.

The use of a large single seed crystal is effective for solving problem (A). The growth rate of a crystal is proportional to its surface area and thus is very slow in the initial period of growth when the crystal surface area is small. Using a single seed crystal with a diameter of 1 mm, it takes one week for the crystal to grow to 3 mm, 10 days to grow to 6 mm, and 2 weeks to grow to 8 mm. Therefore, the growth period can be reduced by more than half by using a seed crystal with a diameter of at least 3 mm. However, if an attempt is made to have a large single crystal grow directly from a seed material with a diameter of 3 mm and larger in the prior art method, a plurality of small single crystals will grow on the seed crystal. This results in the formation of a cluster of crystals having plural growth points and which have a large amount of the solvent included therein. This is because in the conventional temperature gradient method as in FIG. 1, the dissolution preventing layer (4) inserted between the solvent plug (2) and the seed crystal (3) does not disappear until after the solvent has been supersaturated with carbon, thereby preventing the dissolution of the seed crystal. This problem is described more specifically below:

($\alpha$) The use of a large single crystal requires a wide dissolution preventing layer but this layer will not disappear uniformly, causing contact between the solvent and the seed crystal in several areas, where plural crystals grow on the seed in cluster form;

($\beta$) Since the seed crystal contacts the solvent in supersaturated state with carbon, crystal growth occurs immediately, and steps, dirt and crystal defects on the seed crystal will increase the chance of solvent inclusions.

The present inventors have found that these problems ($\alpha$) and ($\beta$) can be effectively solved by employing the following method ($\gamma$):

($\gamma$) The surface of the seed crystal is first dissolved to produce a clean growing surface having no steps, crystal defects or dirt particles; the carbon concentration in the solvent is gradually increased from the unsaturated through saturated to supersaturated state, thereby allowing uniform crystal growth to take place over the entire surface of the dissolved seed crystal.

The present inventors also found that method ($\gamma$) can be effectively implemented by one of the following two means:

(1) Instead of using a dissolution preventing layer, the solvent is preliminarily doped with a carbon at a concentration lower than the supersaturated level; as soon as the solvent starts to melt, the surface of the seed crystal is dissolved and carbon diffusion from the carbon source as denoted by (1) in FIG. 1 is utilized to cause gradual increase in carbon concentration, thereby allowing a single crystal to grow.

In this approach, the concentration of carbon to be preliminarily contained in the solvent is of extreme importance and the present inventors have found that the upper limit of this carbon concentration is 95 wt % of the saturated level under the conditions of crystal growth while the lower limit is 30 wt %. If this upper limit is exceeded, dissolution of the surface of the seed crystal will not substantially occur. If the lower limit is not reached, the seed crystal is lost into the solvent by complete dissolution. The present inventors have found that the range of 50 to 90 wt % is preferred for the purpose of ensuring stable crystal growth.

(2) A dissolution regulating layer is used in place of a dissolution preventing layer. As the dissolution regulating layer, an alloy layer is used that is based on one or more matrix elements selected from Pd, Pt, Rb, Ir, Ru, and Os and which additionally contains from 5 to 30 wt % of Ni and/or Co. The matrix elements listed above are suitable for the purpose of the present invention in that they have a high melting point and that they do not form carbides. The matrix element must be a high-melting point metal in order to ensure that the dissolution regulating layer will not melt at temperatures lower than the point at which the solvent melts. If the dissolution regulating layer forms a carbide, a carbide will also be produced on the surface of the seed crystal and nucleation of crystals might occur, which is detrimental to the purpose of the present invention.

If the dissolution regulating layer is formed of the matrix metal only, it will not melt until after the solvent has become supersaturated with carbon and the problems associated with the prior art method will arise. The present inventors have found that if Ni and/or Co is added to these matrix elements, the dissolution regulating layer will melt uniformly before the solvent is supersaturated with carbon, thereby contributing to the accomplishment of the objective of the present invention. The present inventors also have found that the preferred Ni or Co concentration is in the range of from 5 to 30 wt %. If the Ni or Co concentration is lower than 5 wt %, a cluster of crystals will grow. Beyond 30 wt %, the seed crystal will dissolve in the solvent. Iron attains the same effects as Ni and Co but it often caused the problem of carbide formation under the actual conditions of synthesis employed.

In accordance with the present invention, problem (B) is solved by a different approach as described specifically below.

If a single crystal diamond is grown by the prior art temperature gradient method illustrated in FIG. 1, the following problems occur, making it difficult to obtain a good-quality single crystal of 2 carat or larger and which is free from the metallic solvent:

($\alpha'$) As the crystal grows, the temperature of the growing surface shifts to the hotter side and there occurs a change in the growing surface from the lower-order plane to higher-order plane. The change in the growing surface increases the chance of inclusions of the metallic solvent;

($\beta'$) With the plug of a solvent used in the prior art method, the carbon concentration on the crystal surface is not uniform and the resulting distribution of the degree of carbon supersaturation creates different areas where crystal growth occurs easily and where it is difficult. The latter area will easily incorporate the metallic solvent.

The present inventors have found that problem ($\alpha'$) can be effectively solved by the following means:

(1') Using a (111) surface of a seed crystal as a growing surface, crystal growth is effected in such a way that the fastest growing surface is the (111) surface and that it is perpendicular to the direction of carbon diffusion;

(2') In order to attain a uniform carbon concentration on the crystal growing surface, a plug of a solvent shaped in such a way that its central portion is 20 to 200% higher than the peripheral portion or that a part of the hotter side is spherical is used.

Method (1') is first described with reference to FIG. 2 which depicts how the growing surface changes depending upon the pressure and temperature conditions employed in single crystal synthesis. In this figure, (11) denotes a diamond-graphite stable borderline; (12) is a line disignating the eutecic point of solvent and carbon; (13) is a (100) surface growth region; (14) is a (110) surface growth region; and (15) is a (111) surface growth region.

Figure 2:
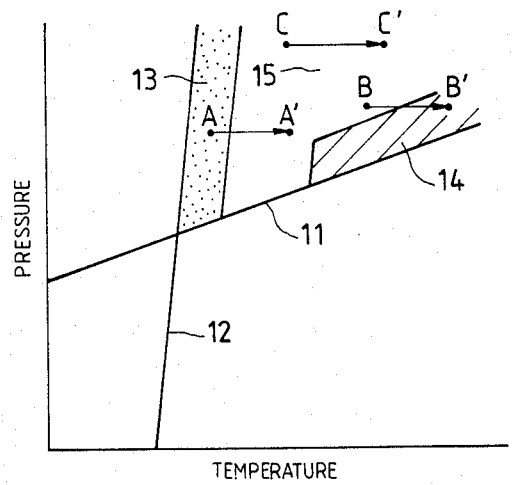
FIG. 2 is a pressure-temperature diagram showing diamond-forming regions of various growing planes.

As shown in FIG. 2, when crystal growth starts at point A and B on the seed crystal, the growing surface gradually shifts toward the hotter side, and at points A' and B' the growing surface makes a transition from (100) to (111) surface, and from (111) to (110) surface, respectively, and this increases the chance of inclusions of the solvent. It is therefore necessary that crystal growth always take place on the (111) surface as indicated by transition from point C to C'.

Figure 3:
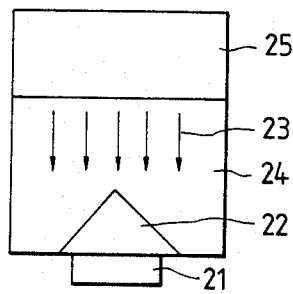
FIG. 3 shows how initial diamond growth occurs when a (100) surface of a seed crystal is used as a growing surface in the prior art synthesis process.

Equally important is the seed crystal surface. By referring to FIG. 3, of a (100) surface of a seed crystal (21) is used as a growing surface, the crystal grows as indicated by (22). In this case, the degree of supersaturation of carbon (diffusing along the direction (23)) diffusing into a solvent (24) from the carbon source (25) is the highest at the tip of the growing crystal. Therefore, the crystal grows rapidly in its central portion and slowly in the peripheral portion. This difference in growth rate increases the chance of solvent inclusions.

Figure 4:
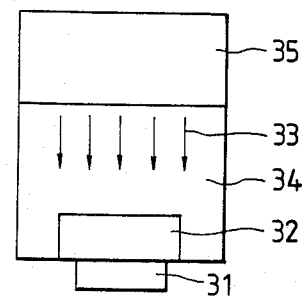
FIG. 4 shows how initial diamond growth occurs when a (111) surface of a seed crystal is used as a growing surface in the prior art synthesis process.

If a (111) surface of a seed crystal (31) is used as a growing surface, crystal growth will occur as indicated by (32) in FIG. 4. In this case, the growing surface is perpendicular to the carbon diffusion direction (33) into a solvent (34) from the carbon source (35), and the degree of supersaturation of carbon is uniform over the entire area of the growing surface, thereby reducing significantly the chance of solvent inclusions.

U.S. Pat. No. 4,034,066 sets forth on column 11, lines 41 to 54 the advantages resulting from using a (100) surface of a seed crystal as a growing surface. *Mukizai-ryo Kenkyusho Hokoku* (Report of Research Institute of Inorganic Materials, Japan), vol. 20, page 9 (1979) also reports the use of a (100) surface of seed crystal as a growing surface in diamond synthesis. Therefore, it has been common practice in the prior art to use the (100) surface as the growing surface of seed crystal.

The present inventors have found that good results are obtained by using the (111) surface as the growing surface of seed crystal rather than the (100) surface principally employed in the prior art. It should however, be noted the (100) surface could also be used as the growing surface of a seed crystal for single crystal growth. In this case, a single crystal including a large amount of a solvent having a small diameter of 1 to 1.5 mm is obtained only by using the (100) surface as the growing surface. In order to obtain a single crystal of good quality having a large diameter of 8 mm or more, the following approaches are required.

(a) The surface of the seed crystal is first dissolved before a crystal is allowed to grow from the seed.

(b) The plug of a solvent is shaped in such a way that its central portion is higher than its peripheral portion by 20 to 200%, or the area in contact with the carbon source is spherical.

Figure 5:
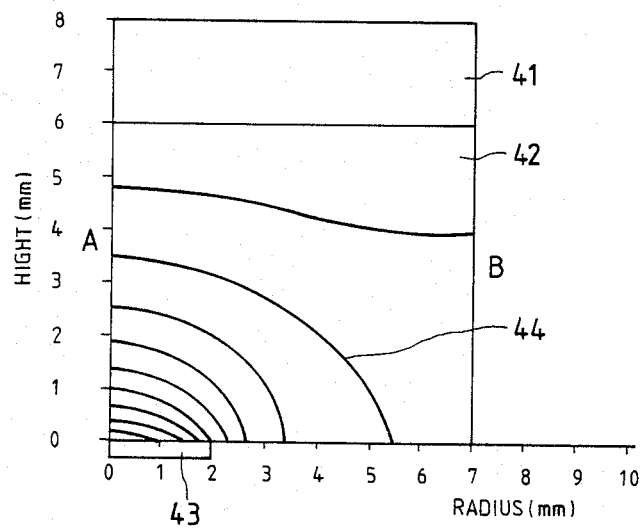
FIG. 5 shows the carbon concentration profile that is produced in the prior art synthesis process and which is calculated by the finite-element method.

Furthermore, when the (100) surface is used as the growing surface, it is necessary to ensure that the fastest growing (100) surface of the growing crystal (32) is perpendicular to the direction of carbon diffusion as shown in FIG. 4. The present inventors have found that to meet this requirement, crystal growth must be controlled to take place at a temperature from 20° to 60° C. higher than the eutectic point of the solvent and carbon. The present inventors have also found that since the fastest growing surface shifts toward the hotter side as the crystal grows, it is more effective to gradually decrease the temperature of the overall reaction system in such a way that the fastest growing surface will always fall within the above-defined temperature range. The method (2') is described below. The solvent used in the prior art process of diamond synthesis is shaped like a cylindrical plug as shown by (2) in FIG. 1. This causes a difference in carbon concentration across the solvent as shown in FIG. 5, in which (41) denotes a carbon source, (42) is a solvent, (43) is a seed crystal, and (44) is a contour line which defines an area having the same carbon concentration. The central area A has the higher carbon concentration than the peripheral area B, so if crystal is allowed to grow as shown in FIG. 4, with a (111) surface of the seed crystal (43) being used as a growing surface, the degree of supersaturation of carbon in the central portion A is lower than that in the peripheral portion B and the growth rate is retarded to increase the chance of solvent incorporation in the central portion of the growing crystal. The larger the crystal grows, the greater the difference in carbon concentration between the central and peripheral regions and hence the greater the difference between the growth rates of the two portions. As a result, entrapping of the metallic solvent would be accelerated if the growth size exceeds 2 carat (6 to 7 mm in diameter).

Figure 6:
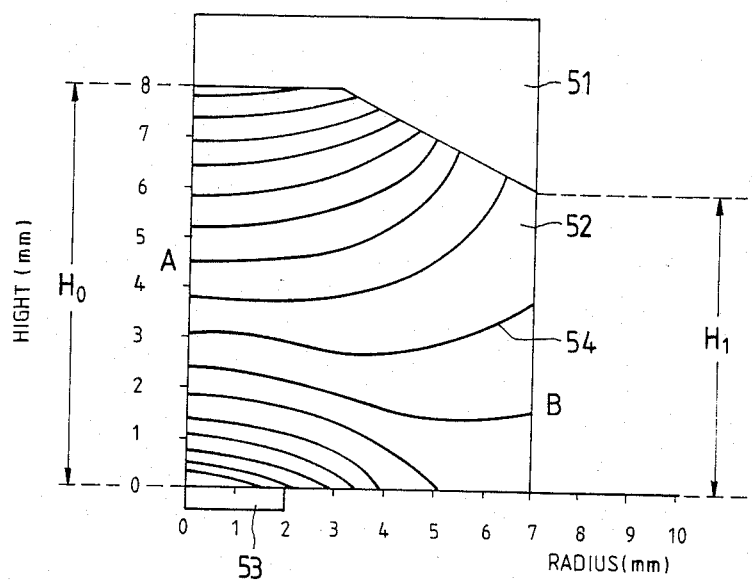
FIG. 6 shows the carbon concentration profile that is produced in the synthesis process of the present invention and which is calculated by the finite-element method.

In order to solve the aforementioned problem, the present invention employs a plug of a solvent which, as shown in FIG. 6, is higher in its central portion A (height $=H_0$) than in the peripheral portion B (height $=H_1$). In FIG. 6, a carbon source is denoted by (51), a solvent by (52), a seed crystal by (53) and a contour line for carbon concentration by (54). Both FIGS. 5 and 6 show carbon concentration profiles as calculated by the finite-element method. In each figure, the same contour line defines an area having the same carbon concentration. Since the carbon concentration profile is symmetrical with respect to the axis (i.e., the center of the seed crystal), only the right half of the profile is shown in cross section in FIGS. 5 and 6. As FIG. 6 clearly shows, the solvent used in the present invention is substantially free from the difference in carbon concentration between its central and peripheral portions A and B on the seed crystal. A single crystal diamond with a diameter of 8 mm or more were successfully synthesized by the present invention without causing inclusions of any impurities.

The present inventors have also found that this advantage can effectively be attained when the ratio of $H_0$ to $H_1$ ($H_0/H_1$) is in the range of from 1.2 to 3. If $H_0/H_1$ is less than 1.2, the above advantages cannot be attained. If $H_0/H_1$ is more than 3, the carbon concentration gradient is reversed and the concentration in the central portion becomes higher than that in the peripheral portion. The shape of the plug of solvent is not limited to what is shown in FIG. 6 and the same results were obtained by a plug which is so shaped that the area where the solvent contacts the carbon source has a spherical surface. The same results are also attained when that area is defined by part of a spherical surface of by an otherwise curved surface or a planar surface. What is important about the shape of the solvent plug is that it has the specified ratio of $H_0$ to $H_1$ during crystal growth, not the shape of the solvent plug set in the reaction vessel before starting synthesis.

In the most preferred embodiment of the present invention, a single crystal diamond with a diameter of 8 mm or more and which has the same cross sectional shape as that of the solvent plug can be synthesized by incorporating the following improvements:

(1″) A seed crystal of which diameter is at least ¼ of the diameter of the solvent plug is used; and (2″) A solvent plug which has a frustoconical shape on the side where the plug contacts the seed crystal, and the seed crystal is mounted on the circular base of the frustum of cone which has a smaller area than the circular base on the other side, and the angle formed between the side wall of the frusum of cone and the circular base on which the seed crystal is mounted is adjusted to be within the range 5° to 45°.

Figure 7:
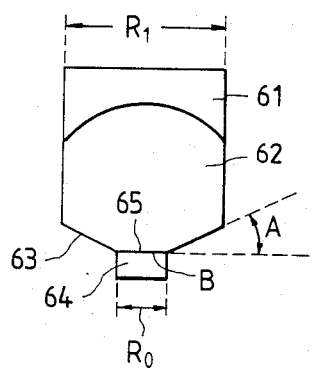
FIG. 7 is a schematic presentation of a process of diamond synthesis according to one embodiment of the present invention.

A plug of a solvent designed to incorporate the two features (1″) and (2″) above is shown schematically in FIG. 7. In this figure, (61) is a carbon source, (62) is the solvent plug, (63) is the frustum of cone in the lower part of the solvent plug, (64) is a seed crystal, (65) or B is the circular base of the frustum of cone (or the seed crystal surface), and A is the angle formed between the side wall of the frustum of cone and the seed crystal surface. By making the diameter ($R_0$) of the seed crystal (64) not smaller than ¼ of the diameter ($R_1$) of the solvent plug, the amount of metallic solvent entrapped in the growing crystal until the time when the diameter of the crystal reaches $R_1$ can be reduced. Even if diamond synthesis is performed in such a way that the condition for transistion from point C to C' (FIG. 2) is satisfied, occasional growth of higher-order planes such as a (113) surface occurs. The chance of inclusions of the metallic solvent will increase as a result of the growth and disappearance of such higher-order surfaces. The probability that the higher-order surfaces come into existence until the time the crystal grows to the size $R_1$ can be decreased when the ratio of $R_0$ to $R_1$ was controlled to be not less than ¼.

The angle formed between the side wall of the cone of frustum and the circular base (or the seed crystal surface) which is adjusted to fall within the range of from 5° to 45° is also effective in decreasing the inclusions of the metallic solvent that might occur by the time the diameter of the growing single crystal reaches the diameter $R_1$ of the metallic solvent. Such angular adjustment is particularly effective against the inclusions of the metallic solvent in the case where the diameter of the growing crystal is approximately equal to $R_1$.

The present inventors have found that even when a (100) surface of the seed crystal is used as a growing surface, the same results as those described above can be obtained by effecting crystal growth at a temperature from 20° to 60° higher than the eutecic point of the metallic solvent and carbon.

The mechanism by which the present invention attains its intended advantages can be summarized as follows:

According to one aspect of the invention (γ) above, a seed crystal surface is first dissolved before a crystal is grown from the seed and this enables a single crystal of good quality to be grown from a large seed crystal, thereby achieving a significant decrease in the growth period.

According to another aspect, combination of (1′) and (2′), a (111) surface of the seed crystal is used as a growing surface and the plug of a solvent is so shaped that its central portion is higher than the peripheral portion, and this enables the synthesis of a single crystal diamond of good quality with a diameter of 8 mm or more.

Even if a (100) surface of the seed crystal is used as a growing surface, a single crystal of good quality having an 8 mm diameter or more can be synthesized by properly controlling the temperature condition for crystal growth.

If a plurality of reaction vessels incorporating the concept of the present invention are stacked one on top of another, a number of large diamonds can be synthesized simultaneously.

The following examples are provided for the purpose of further illustrating the present invention but are in no way to be taken as limiting.

Example 1

Figure 8:
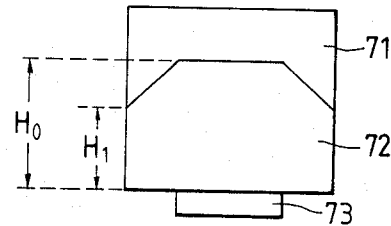
FIG. 8 is a schematic presentation of a process of diamond synthesis according to another embodiment of the present invention.

Using a plug of solvent having the shape shown in FIG. 8 according to the present invention, single crystal diamonds were synthesized in the diamond-stable region where the growth of (111) surfaces were predominant, with the amount of carbon in the solvent being varied as shown in Table 1. In FIg. 8, the carbon source is denoted by (71), the solvent by (72), and the seed crystal by (73). The results are also shown in Table 1. The metallic solvent was Fe-50%Ni. The pressure and temperature conditions for synthesis were 5.8 GPa and 1,400° C., respectively. The diamond synthesis was completed in 144 hours. Seed crystals used had a diameter of 3 mm and the (111) surface was used as a growing surface.

TABLE 1

| Run No. | 1 | 2 | 3 | 4 | 5 | 6 |
|---|---|---|---|---|---|---|
| Amount of carbon added (wt %) | 1.1 | 1.65 | 2.75 | 4.4 | 5.23 | 6.05 |
| Carbon addition/ saturated concentration (%) | 20 | 30 | 50 | 90 | 95 | 110 |
| Synthesized single crystal | did not grow | did not grow sufficiently, 6 mm$^\phi$ | 8 mm$^\phi$ | 9 mm$^\phi$ | partly a cluster, with the remainder being single crystal (7 mm$^\phi$) | a cluster |
| State of seed crystal | dissolved away | two-thirds dissolved away | surface dissolved | surface dissolved | surface dissolved only sparingly | surface did not dissolve |

As Table 1 shows, optium results were attained when carbon was added to the metallic solvent in an amount of from 50 to 90 wt % of the saturated concentration. The same results were attained when the same experiment was conducted using other solvents of the species listed later in Example 4.

Example 2

Using a plug of a solvent of the conventional type shown in FIG. 1, single crystal diamonds were synthesized in the diamond-stable region where the growth of (111) surfaces was predominant, with the size of seed crystal being varied as shown in Table 2. The results are also shown in Table 2. Nickel was used as the metallic solvent. The pressure and temperature conditions for synthesis were 5.8 GPa and 1,420° C., respectively. The diamond synthesis was completed in 72 hours. Four seed crystals ranging from 1 to 4 mm in diameter were used and the (111) surfaces was selected as the growing surface. A platinum foil having a 100 μm thickness was used as a seed crystal dissolution preventing layer. No carbon was added to the metallic solvent.

TABLE 2

| Run No. | 11 | 12 | 13 | 14 |
|---|---|---|---|---|
| Seed crystal size (mm in dia.) | 1 | 2 | 3 | 4 |
| Synthesized | 2 mm$^\phi$, good quality | 3.5 mm$^\phi$, appreciable solvent inclusions | a cluster | a cluster |

As Table 2 shows, the prior art process was unable to synthesize single crystal diamond of good quality from seed crystals with a diameter of 2 mm or more. When seed crystals with a diameter of 3 mm or more were used, a cluster of crystals rather than a single crystal were produced. The same results were attained when the same experiment was conducted using other metallic solvents of the species listed later in Example 4.

EXAMPLE 3

Figure 9:
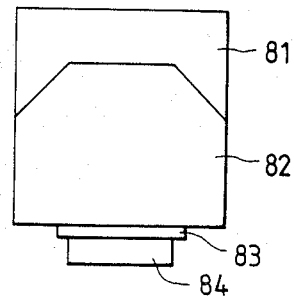
FIG. 9 is a schematic presentation of a process of diamond synthesis according to a further embodiment of the present invention.

Using a dissolution regulating layer as denoted by (83) in FIG. 9 according to the present invention, single crystal diamonds were synthesized in the diamond-stable region where the growth of (111) surfaces was predominant, with the Ni content of the dissolution regulating layer (Pd-Ni alloy) being varied as shown in Table 3. In FIG. 9, the carbon source is denoted by (81), the solvent by (82), and the seed crystal by (84). The results are also shown in Table 3. The metallic solvent (82) used was Fe-50%Ni. The pressure and temperature conditions for synthesis were 5.8 GPa and 1,400° C., respectively. The diamond synthesis was completed in 144 hours. The seed crystals with a diameter of 3 mm were used and the (111) surfaces was selected as a growing surface.

TABLE 3

| Run No. | 21 | 22 | 23 | 24 | 25 |
|---|---|---|---|---|---|
| Amount of Ni added (wt %) | 2 | 5 | 10 | 30 | 40 |
| Synthesized single crystal | a cluster | 8 mm$^\phi$, good quality | 9 mm$^\phi$, good quality | 9 mm$^\phi$, good quality | 6 mm$^\phi$, good quality |
| State of seed crystal | dissolved only sparingly | surface dissolved | surface dissolved | surface dissolved | three-fifths dissolved away |

As Table 3 shows, single crystal diamonds with a diameter of 8 mm or more were successfully synthesized when the Ni content in the dissolution regulating layer was in the range of from 5 to 30 wt % of the Pd alloy. The same results were attained when the Ni was replaced by Co or a Co-Ni alloy. The results were also the same when the Pd as the matrix element was replace by alloys containing one or more of Pt, Rb, Ir, Rb and Os. The same results were attained when the same experiment was conducted using other solvent materials of the species listed later in Example 4.

EXAMPLE 4

Using a plug of solvent having the shape shown in FIG. 8 according to the present invention, two runs of diamond synthesis experiment were conducted, with a (100) surface of seed crystal being used as a growing surface in one run, and with a (111) surface being used as a growing surface in the other run. The solvent used as Fe-70%Ni which was preliminarily doped with carbon in an amount of 90 wt % of the saturated concentration. In each run, a seed crystal with a diameter of 3 mm was used. Synthesis was completed in 144 hours. The results are shown in Table 4.

TABLE 4

| Run No. | 31 | 32 |
|---|---|---|
| Growing surface of seed crystal | (111) | (100) |
| Synthesis conditions: | | |
| pressure | 5.8 GPa | 5.8 GPa |
| Temperature | 1,400° C. | 1,350° C. |
| Synthesized single crystal | 9 mm$^\phi$, good quality | 8 mm$^\phi$, metallic solvent included |

TABLE 4-continued

| Run No. | 31 | 32 |
|---|---|---|
| | | in the top of single crystal |

As Table 4 shows, a single crystal of the better quality was synthesized by using a (111) surface of the seed crystal as a growing surface. The same results were attained when Fe-70%Ni was replaced by other solvent species which were selected from among Fe, Ni, Co, Mn, Cr, Al, Ti, Nb, V and alloys thereof.

EXAMPLE 5

Using a plug of a solvent having the shape shown in FIG. 8 according to the present invention, single crystal diamonds were synthesized with the height of the central portion $H_0$ of the plug and the height of the peripheral portion $H_1$ being varied as shown in Table 5. The results are also shown in Table 1. The solvent used was Fe-3%Al which was preliminarily doped with carbon in an amount of 80 wt % of the saturated concentration. Seed crystals used had a diameter of 3 mm and single crystal was grown from a (111) surface. The pressure and temperature employed for synthesis were 5.8 GPa and 1,410° C., respectively. In each run, synthesis was completed in 144 hours.

TABLE 5

| Run No. | 41 | 42 | 43 | 44 | 45 |
|---|---|---|---|---|---|
| $H_0/H_1$ | 1 | 1.2 | 2 | 3 | 3.5 |
| Synthesized single crystal | 8 mm$^\phi$, solvent included in the central portion | 9 mm$^\phi$, good quality | 9 mm$^\phi$, good quality | 9 mm$^\phi$, good quality | 9 mm$^\phi$, solvent included in the peripheral portion |

As Table 5 shows, single crystals of good quality were sucessfully synthesized when $H_0/H_1$ was within the range of from 1.2 to 3. The same results were attained when other solvents of the species mentioned in Example 4 were employed. The results were also the same when the area where the solvent plug (72) contacted the carbon source (71) was shaped to have a spherical or otherwise curved surface. Similar results were attained with a hemispherical solvent plug.

EXAMPLE 6

Using a plug of solvent having the shape shown in FIG. 7 according to the present invention, single crystal diamonds were synthesized with the ratio of the outside diameter of solvent plug $R_1$ to the outside diameter of seed crystal $R_0$ being varied as shown in Table 6. The outside diameter of the solvent plug $R_1$ was held constant at 8 mm, and the angle A formed between the side wall of cone of frustum and its base was controlled to be 30°. Fe-50%Ni alloy was used as the solvent, which was preliminarily doped with carbon in an amount of 80 wt % of the saturated concentration. The seed crystal was mounted in such a way that a single crystal would be grown from a (111) surface. The outside diameter of the seed crystal $R_0$ was varied from 1.6 mm to 8 mm so that the ratio of $R_0/R_1$ was changed as shown in Table 6. The pressure and temperature conditions for synthesis were 5.8 GPa and 1,400° C., respectively. The diamond was grown over a period of about one week. The results are shown in Table 6.

TABLE 6

| Run No. | 11 | 12 | 13 | 14 |
|---|---|---|---|---|
| $R_0/R_1$ | 1/5 | 1/4 | 1/2 | 1 |
| $R_0$ (mm) | 1.6 | 2 | 4 | 8 |
| Synthesized single crystal | 8 mm$^\phi$, appreciable solvent inclusions | 8 mm$^\phi$, good quality | 8 mm$^\phi$, good quality | 8 mm$^\phi$, good quality |

As Table 6 shows, single crystal diamonds of good quality were successfully synthesized when the ratio of the outside diameter of seed crystal to that of solvent plug ($R_0/R_1$) was within the range of from ¼ to 1. The same results were attained when the same experiment was conducted with other solvent material of the species listed in Example 4. In each run, the synthesized diamond had the same cross-sectional shape as the solvent plug.

EXAMPLE 7

Using a plug of solvent having the shape shown in FIG. 7 according to the present invention, single crystal diamonds were synthesized, with the angle A formed between the side wall of the lower frustoconical portion of the solvent plug and its base B (in contact with a seed crystal) being changed as shown in Table 7. The solvent used was Fe-3%Al; its outside diameter $R_1$ was 8 mm; and the diameter of base B was 4 mm. The solvent was preliminarily doped with carbon in an amount of 80 wt % of the saturated concentration. Seed crystals used had a diameter ($R_0$) of 4 mm and were mounted in such a way that single crystal was grown from a (111) surface. The pressure and temperature conditions for synthesis were 5.8 GPa and 1,410° C., respectively. In each run, crystal was grown over a period of about one week. The results are shown in Table 7.

TABLE 7

| Run No. | 61 | 62 | 63 | 64 | 65 |
|---|---|---|---|---|---|
| Angle of A (degrees) | 2 | 5 | 30 | 45 | 50 |
| Synthesized single crystal | 8 mm$^\phi$, appreciable solvent inclusions in the periphery | 8 mm$^\phi$, good | 8 mm$^\phi$, good | 8 mm$^\phi$, good | 8 mm$^\phi$, appreciable solvent inclusions in the top peripheral portion |

As Table 7 shows, single crystal diamonds of good quality were successfully synthesized when angle A formed between the side wall of the lower frustoconical portion of solvent plug and the seed crystal surface was within the range of from 5° to 45°.

The same results were attained when the same experiment was conducted using other solvent of the species listed in Example 4. In each run, synthesized diamond had the same cross-sectional shape as the solvent plug.

EXAMPLE 8

Using a plug of solvent having the shape shown in FIG. 8 according to the present invention, single crystal diamonds were synthesized at 5.8 GPa and at temperatures at the start of crystal growth between 1,300 and 1,400° C., with a (100) surface of seed crystal being used as a growing surface. The solvent metal was Fe-50%Ni, which was preliminarily doped with carbon in an amount of 70 wt % of the saturated concentration. In each run, the synthesis time was 144 hours and seed crystals with a diameter of 3 mm were employed. As crystal grew, the operating temperature was slowly decreased at a rate of 0.2° C./hour. The results are shown in Table 8.

TABLE 8

| Run No. | 71 | 72 | 73 | 74 | 75 |
| --- | --- | --- | --- | --- | --- |
| Temperature (°C.) | 1,300 | 1,320 | 1,340 | 1,380 | 1,400 |
| Synthesized crystal | solvent did not dissolve nor crystal growth did not occur | a cluster of black skeletal crystals | crystal of good quality, 9 mm | crystal of good quality, 8 mm | solvent included in crystal, 6.5 mm |

As Table 8 shows, single crystal diamonds of good quality were successfully synthesized when a (100) surface of the seed crystal is used as a growing surface, and the growth temperature is from 20° to 60° C. higher than the eutectic point of the solvent and carbon.

As described in the foregoing, according to one aspect of the present invention, a (111) surface of seed crystal is used as a growing surface and a plug of a solvent which is higher in its central portion than in the peripheral portion is used. According to the present invention, a single crystal diamond of good quality having a diameter of 8 mm or larger can be synthesized with the crystal growing at a uniform rate over its entire surface and without causing inclusions of the solvent metal.

If, in accordance with another aspect of the present invention, a (100) surface of the seed crystal is used as a growing surface, a single crystal diamond having a diameter of 8 mm or more can be synthesized by selecting a growth temperature from 20° to 60° C. higher than the eutectic point of the solvent and carbon.

In accordance with the present invention, the surface of a seed crystal having a diameter of 3 mm or more is first dissolved before a crystal is grown from the seed. This enables a large single crystal diamond to be synthesized in a shorter period of time. The process of the present invention reduces the growth time by more than half the period required in the prior art process and this contributes greatly to cost reduction.

While the invention has been described in detail and with reference to specific embodiments thereof, it will be apparent to one skilled in the art that various changes and modifications can be made therein without departing from the spirit and scope thereof.

What is claimed is:

1. A process for synthesizing a single crystal diamond having a diameter of 8 mm or more by the temperature gradient method, wherein a (111) surface of a seed crystal having a diameter of 3 mm or more is used as a growing surface, the entire area of said growing surface is first dissolved in the diamond-stable region before crystal growth is started, said crystal growth is effected using a plug of a solvent in which the height of the central portion thereof is higher than the height of the peripheral portion thereof, said plug of a solvent has a planar or curved surface on the side where said plug of a solvent contacts a carbon source during said crystal growth, and said crystal growth is effected under such pressure and temperature conditions that the growth of said (111) surface is predominant.

2. A process for synthesizing a single crystal diamond having a diameter of 8 mm or more by the temperature gradient method, wherein a (100) surface of a seed crystal having a diameter 3 mm or more is used as a growing surface, said growing surface is exposed to a diamond-stable pressure and to a temperature from 20° to 60° C. higher than the eutectic point of a solvent and carbon, the entire area of said growing surface is first dissolved before crystal growth is started, said crystal growth is effected using a plug of a solvent in which the height of the central portion thereof is higher than the height of the peripheral portion thereof, said plug of a solvent has a planar or curved surface on the side where a said plug of a solvent contacts a carbon source during said crystal growth, and said crystal growth is effected under such pressure and temperature conditions that the growth of said (100) surface is predominant.

3. A process according to claim 1 or 2, wherein said growing surface of said seed crystal is dissolved using a solvent preliminarily doped with carbon in an amount of from 50 to 80 wt % based on the saturated carbon concentration thereof under the conditions during said crystal growth.

4. A process according to claim 1 or 2, wherein said growing surface of said seed crystal is dissolved upon which an alloy layer is inserted between said seed crystal and said solvent, and said alloy layer contains from 5 to 30 wt % of at least one of Ni and Co added to at least one matrix metal selected from among Pd, Pt, Rb, Ir, Ru and Os.

5. A process according to claim 1 or 2, wherein said plug of a solvent is in the form that the central portion thereof is from 20 to 200% thicker than the peripheral portion thereof or that the surface thereof where said plug of a solvent contacts said carbon source is spherical.

6. A process according to claim 1 or 2, wherein a diamond having the same cross-sectional shape as said plug of a solvent is synthesized using a seed crystal of which diameter is ¼ or more of the diameter of said plug of a solvent, said plug of a solvent has a frustoconical shape on the side where said plug of a solvent contacts said seed crystal, said seed crystal is mounted on the circular base of the frustum of cone of said plug of a solvent which has a smaller area than the circular base on the other side, and the angle formed between the side wall of said frustum of cone and said circular base on which said seed crystal is mounted is in the range of from 5° to 45°.

* * * * *